(12) United States Patent
Park et al.

(10) Patent No.: US 7,102,881 B2
(45) Date of Patent: Sep. 5, 2006

(54) SLIDE TYPE PORTABLE TERMINAL

(75) Inventors: Ji-Sung Park, Seoul (KR); Sang-Hyuk Im, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 10/784,798

(22) Filed: Feb. 24, 2004

(65) Prior Publication Data
US 2005/0018394 A1 Jan. 27, 2005

(30) Foreign Application Priority Data
Jul. 25, 2003 (KR) ...................... 10-2003-0051621

(51) Int. Cl.
*H05K 5/00* (2006.01)
*H05K 7/00* (2006.01)
(52) U.S. Cl. ..................... 361/683; 361/755
(58) Field of Classification Search ............... 361/296, 361/683, 752, 755, 756, 802; 16/303, 328, 16/367; 455/422.1, 462, 550, 575, 556; 379/433.12, 379/13; 24/467; 439/152–160; 312/9.3, 312/9.14, 9.15, 135, 260, 261
See application file for complete search history.

(56) References Cited

U.S. PATENT DOCUMENTS

| 6,392,881 | B1 * | 5/2002 | Saitoh ...................... 361/686 |
| 6,496,365 | B1 * | 12/2002 | Tsai ........................... 361/686 |
| 6,539,208 | B1 * | 3/2003 | Mori ....................... 455/575.3 |
| 6,614,650 | B1 * | 9/2003 | Tabata ....................... 361/681 |
| 6,822,871 | B1 * | 11/2004 | Lee et al. ................... 361/727 |
| 2003/0064688 | A1 * | 4/2003 | Mizuta et al. ................ 455/90 |
| 2003/0174240 | A1 * | 9/2003 | Wada et al. ................ 348/374 |
| 2004/0137940 | A1 * | 7/2004 | Matsunami .............. 455/550.1 |
| 2005/0070348 | A1 * | 3/2005 | Lee et al. ................ 455/575.4 |
| 2005/0079902 | A1 * | 4/2005 | Chen et al. .............. 455/575.4 |
| 2005/0160558 | A1 * | 7/2005 | Kim ........................... 16/367 |

FOREIGN PATENT DOCUMENTS

| CN | 1416256 A | | 5/2003 |
| GB | 2384389 A | * | 7/2003 |

* cited by examiner

*Primary Examiner*—Lynn Feild
*Assistant Examiner*—Ingrid Wright
(74) *Attorney, Agent, or Firm*—Fleshner & Kim LLP

(57) ABSTRACT

The present invention relates to a slide type portable terminal and methods for the same. Embodiments of a slide type portable terminal can include a main unit having key sections that are formed on a surface of the main unit, a slide unit that can slide relative to the surface of the main unit to cause each of the plurality of the key sections of the main unit to be covered and exposed and a slide driving mechanism for causing the slide unit to slide, for example, using restorative forces. The slide mechanism can include coil springs guided by guide bars. The guide bars can have both ends rotatably coupled to the main and slide units, respectively, such that the lengths of portions of the guide bars can change as the slide unit is moved.

21 Claims, 13 Drawing Sheets

SLIDE TYPE PORTABLE TERMINAL

BACKGROUND OF THE INVENTION

1. Field of the Invention

The present invention relates to a slide type portable terminal, and more particularly, to a slide type portable terminal in which a slide unit and a main unit can be slid against each other.

2. Background of the Related Art

As examples of a portable terminal, there are a mobile phone whose main function is a telephone function, a PDA (personal digital assistant) whose main function is an electronic note, a smart phone having a combined telephone and electronic note function, and the like. Such a portable terminal can be classified into bar type, flip type, folder type and the like according to an external configuration thereof.

Recently, a slide type portable terminal has come into the market. A configuration of a related art slide type portable terminal is illustrated in FIGS. 1 and 2.

As shown in FIGS. 1 and 2, the slide type portable terminal includes a flat, plate-shaped main unit 1 and slide unit 5 that are coupled to be slid along a longitudinal direction. A display screen 2 is provided on a front surface of the main unit 1. A variety of information is displayed on the display screen 2. A speaker 3 is also provided on an upper end of the front surface of the main unit 1 adjacent to the display screen 2. Further, a plurality of function buttons 4 are provided on a lower end of the front surface of the main unit 1.

The slide unit 5 can be slid against the main unit 1 to protrude beyond the main unit 1 at a predetermined distance and is provided with a plurality of number buttons 6 at a front surface thereof The number buttons 6 are fully exposed to the outside when the slide unit 2 is slid against and protrudes beyond the main unit 1. However, the number buttons 6 are covered with the main unit 1 when the slide unit 5 and the main unit 1 overlap each other. Further, a microphone 7 is provided on a lower end of the front surface of the slide unit 5.

FIG. 2 shows a structure for providing the sliding operation of the main unit 1 and slide unit 5 with respect to each other. In such a case, a main plate 10 and a slide plate 15 serve as the sliding structure. The main plate 10 is fixed to the main unit 1 and the slide plate 15 is fixed to the slide unit 5.

Guide channels 11 are formed on both lateral sides of the main plate 10 in a longitudinal direction. Further, fixing holes 12 are bored through lateral ends of the main plate 10. The fixing holes 12 are portions into which an end of a torsion spring 19 are fixed.

The slide plate 15 is relatively shorter than the main plate 10. Further, guide ribs 16 are formed at both lateral ends, respectively, such that the slide plate 15 can be guided and slid along the guide channels 11. Fixing holes 17 are also bored through the center of the slide plate 15.

The main plate 10 and the slide plate 15 are interconnected through the torsion spring 19. That is, an end of the torsion spring 19 is fitted into the fixing hole 12 of the main plate 10 while the other end of the torsion spring 19 is fitted into the fixing hole 17 of the slide plate 15. A pair of the torsion springs 19 are provided in a symmetric manner.

According to the related art slide type portable terminal, when the slide unit 5 is slid against the main unit 1, the slide plate 15 is slid along the main plate 10. At this time, the torsion spring 19 provides an elastic force such that the slide unit 5 can be kept in a state (i.e., closed) where it overlaps the main unit 1 and a state (i.e., open) where it fully protrudes beyond the main unit 1 (i.e., a state of FIG. 1). In other words, if a user moves the slide unit 5 to a certain position with respect to the main unit 1, the slide unit 5 will be moved toward a predetermined position by means of the elastic force of the torsion spring 19.

However, as described above, the related art slide type portable terminal has various problems and disadvantages. According to the related art, the slide unit 5 is slid against the main unit 1 up to a predetermined position using a force applied by the user and from the predetermined position using the elastic force of the torsion spring 19. In particular, the elastic force of the torsion spring 19 is used to allow the slide unit 5 to be positioned at both ends (i.e., open and closed states) of the stroke in which the slide unit 5 can be slid along the main unit 1. However, the torsion spring 19 is configured such that both ends thereof are fixed to the main plate 10 and the slide plate 15, respectively, while the other portions thereof can be freely moved. Therefore, there is a problem that since the elastic force of the torsion spring 19 is not always constant, the sliding operation of the slide unit 5 against the main unit 1 cannot be kept uniform.

Further, the elastic force of the torsion spring 19 cannot be exerted on the slide unit 5 until the slide unit 5 is slid further than a half of the stroke of the slide unit 5. Thus, the user should apply a force to the slide unit 5 for a relatively long distance for the slide unit 5 to be properly operated. Therefore, there is another problem in that the sliding operation of the slide unit 5 is relatively difficult.

Moreover, there is a problem in that the user cannot be clearly aware that the slide unit 5 has been completely opened or closed (i.e., that the slide unit 5 has been moved to opposite end locations). In other words, positions where the main unit 1 is fully opened and closed because of the sliding operation of the slide unit 5 are not clearly known by the user.

In addition, the main unit 1 can be either overlapped with or fully exposed to the outside because of the elastic force of the torsion spring 19. Therefore, there is a problem in that it is hard for the user to use the portable terminal in various modes.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a slide type portable terminal in which a sliding operation of a slide unit can be uniformly performed.

Another object of the present invention is to provide a slide type portable terminal in which an elastic force required for a sliding operation of a slide unit can be applied within a wider range of the sliding operation.

Another object of the present invention is to provide a slide type portable terminal that is capable of indicating that the slide unit has been moved to its open and close positions.

Another object of the present invention is to provide a slide type portable terminal that is capable of operating in a state where only desired keys are exposed to the outside.

In order to achieve at least the above objects and advantages in a whole or in part, in accordance with one aspect of the present invention there is provided a slide type portable terminal that includes a main unit including a plurality of key sections on a surface of the main unit, a slide unit configured to slide along the surface of the main unit to cause the key sections of the main unit to be selectively covered and a slide driving mechanism configured to cause the slide unit to slide using elastic forces of which elastic deformation is guided by guide bars, when the slide unit has been moved to a predetermined position with respect to the main unit.

To further achieve at least the above objects and advantages in a whole or in part, in accordance with one aspect of the present invention there is provided a slide type portable terminal that includes a main unit including a plurality of key sections on a surface of the main unit, a slide unit configured to slide along the surface of the main unit to cause the key sections of the main unit to be covered and exposed and driving unit for sliding the slide unit using elastic forces of coil springs of which elastic deformation is guided by rotatable guide unit, when the slide unit has been moved to a predetermined position with respect to the main unit and stopper unit for causing the slide unit to be selectively stopped with respect to the main unit at positions where the slide unit exposes only selected key sections.

To further achieve at least the above objects and advantages in a whole or in part, in accordance with one aspect of the present invention there is provided a slide type portable terminal that includes a main unit including a plurality of key sections exposed in a surface of the main unit, a slide unit configured to slide along the surface of the main unit to cause the key sections of the main unit to be selectively covered and a stopper mechanism configured to temporarily fix the slide unit at a plurality of positions where the key sections are selectively exposed, wherein the stopper mechanism includes a plurality of stopper springs with protruding projections on one of the main and the slide units and a plurality of stopper grooves recessed on the other of the main and the slide units and configured to removably receive the stopper springs, wherein the stopper springs move from a first stopper groove to a second stopper groove when force is applied to the slide unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
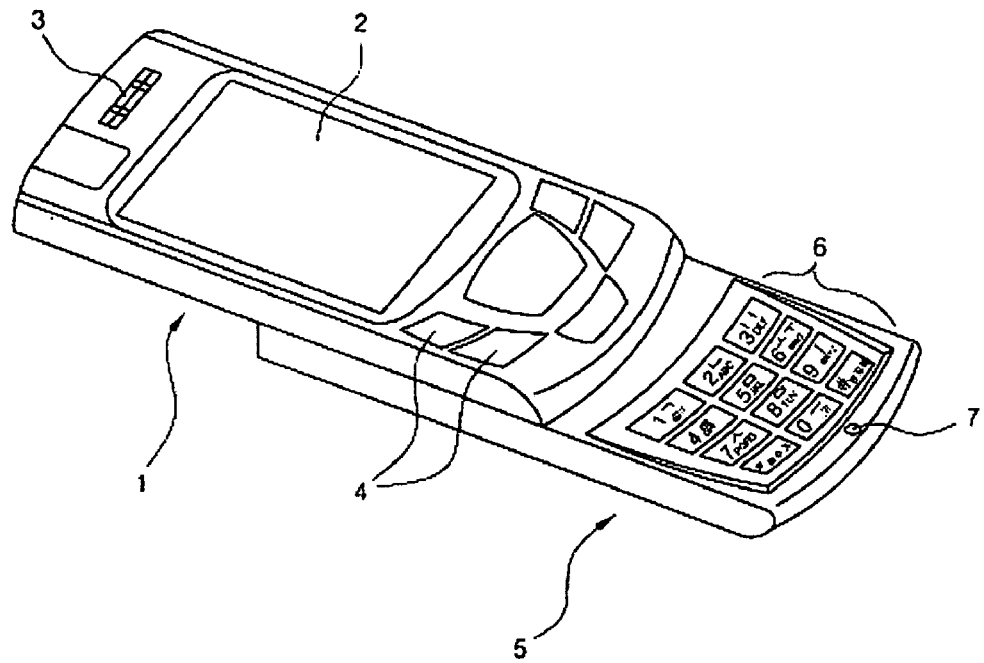
FIG. 1 is a diagram showing a perspective view of a related art slide type portable terminal.
Figure 2:
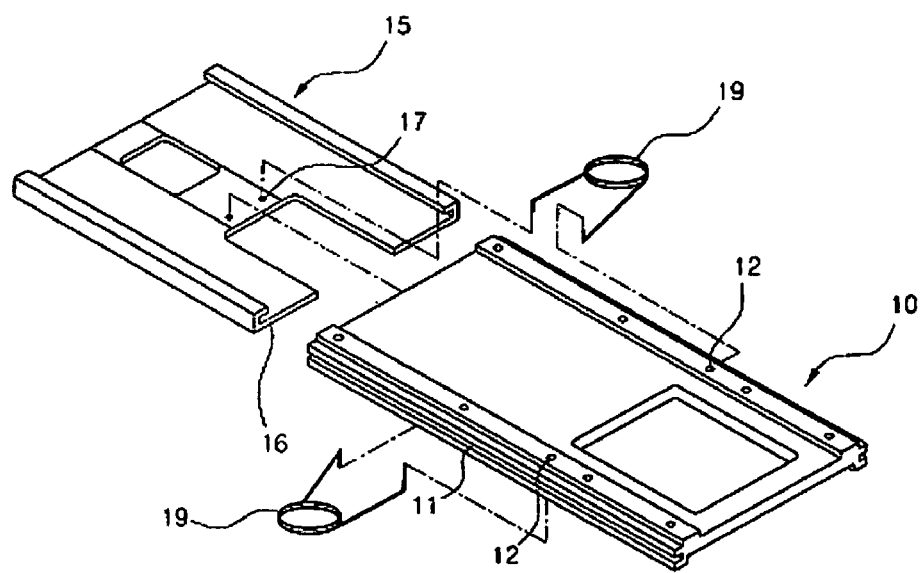
FIG. 2 is a diagram showing an exploded perspective view of main portions of the related art slide type portable terminal.
Figure 3:
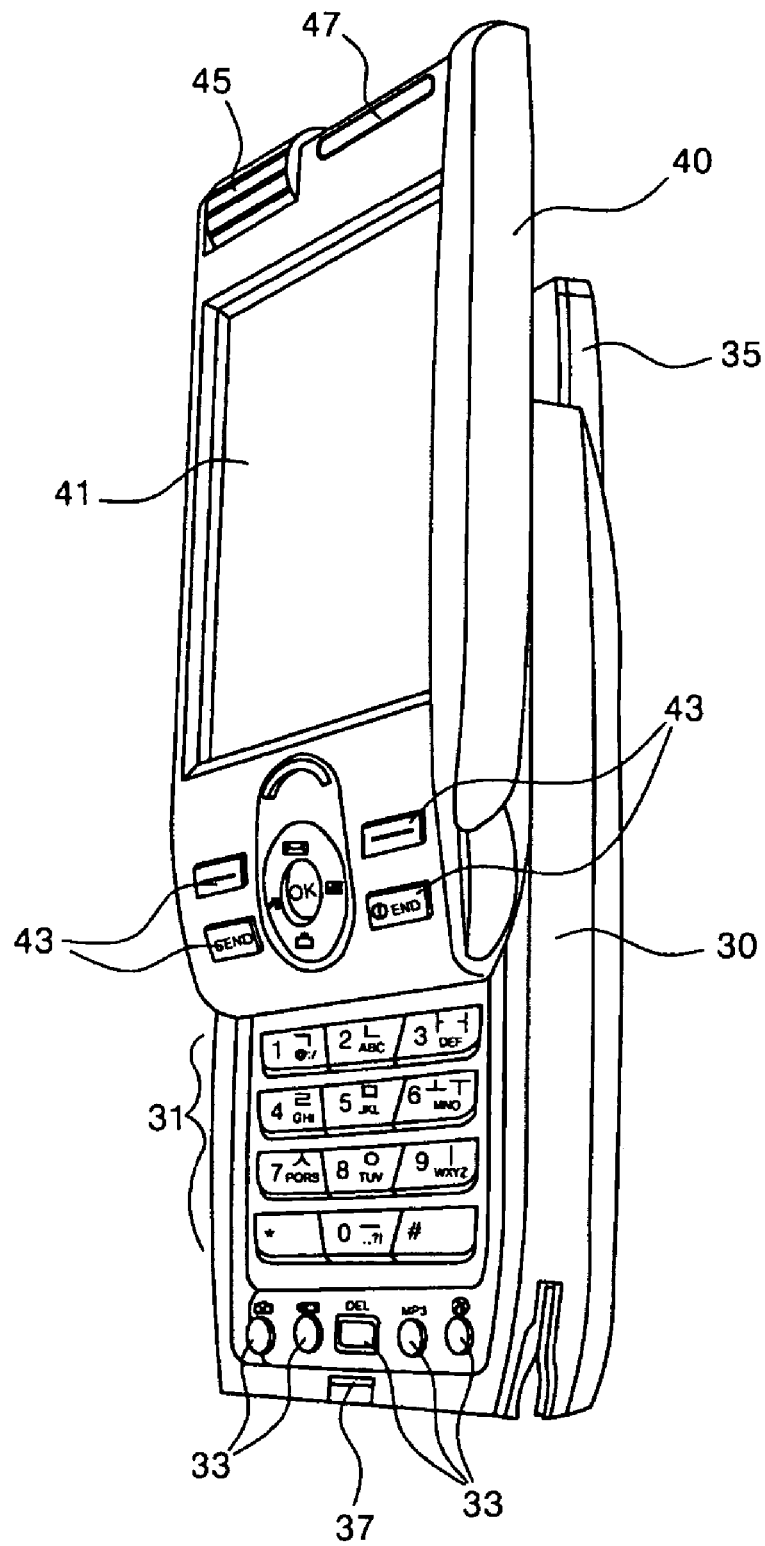
FIG. 3 a diagram showing a perspective view of a preferred embodiment of a slide type portable terminal according to the present invention.
Figure 4:
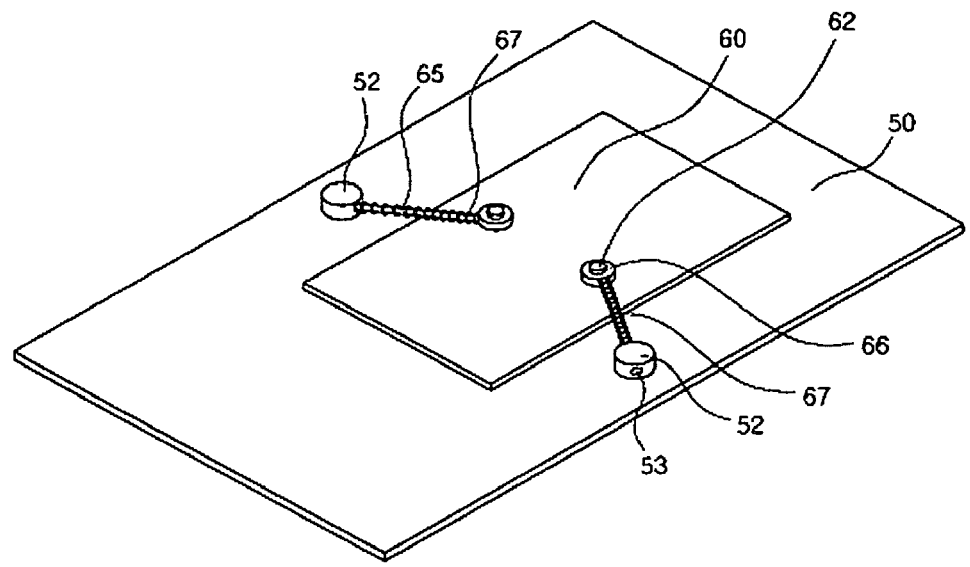
FIG. 4 is a diagram showing a perspective view of a preferred embodiment of a slide driving mechanism according to the present invention.

FIG. 3 is a diagram showing a perspective view of a slide type portable terminal according to an embodiment of the present invention. FIG. 4 is a diagram showing a perspective view of a structure of an embodiment of a slide driving mechanism according to the present invention.

As shown in FIGS. 3–4, a main unit 30 can take the shape of a generally thin hexahedron and is provided with a plurality of number keys 31 at a front surface thereof. The number keys 31 have a function of inputting numbers, characters and the like.

Multimedia keys 33 can also be provided below the number keys 31, e.g., at a lower end of a front surface of the main unit 30. The multimedia keys 33 (e.g., additional function keys) can be used to perform an inherent multimedia function of the terminal or the like. For example, the multimedia key may include a key for operating a camera 45 (described below), a key for playing the MP3, or the like. These multimedia keys 33 are provided in an area or a row preferably at the lower end of the front surface of the main unit 30.

An antenna 35 can be provided at one side of an upper end of the main unit 30. The antenna 35 is required for external communications. A microphone 37 can also be provided at a lowermost end of the front surface of the main unit 30. The microphone 37 functions as a telephone transmitter when the terminal is used as a telephone.

Further, a slide unit 40 can be provided on the front surface of the main unit 30. The slide unit 40 can also take the shape of a generally thin hexahedron and is preferably provided with a display screen 41 on a front surface thereof. As the display screen 41, a liquid crystal panel is commonly used but a liquid crystal panel having a touch screen function or the like may also be used. An input device for the touch screen can be coupled to the portable terminal. In addition, other various display units such as an inorganic EL (electroluminescent) display may be used for the display screen 41.

A plurality of function keys 43 can be provided at a lower end of the front surface of the slide unit 40. The function keys 43 preferably allow the function of the terminal to be immediately performed. For example, the function keys can include a key used to execute a program for sending and receiving an electronic mail, a key used to perform a telephone function when receiving a phone call, a key used to select contents displayed on the display screen 41, and the like. Of course, the function keys 43 are not necessarily provided on the slide unit 40. A camera 45 can be included, for example, at an upper and of the slide unit 40, and a speaker 47 can be included.

The main unit 30 and the slide unit 40 can reciprocally slide against each other in a longitudinal direction so that the number keys 31 and the multimedia keys 33 can be exposed or covered. To allow the main unit 30 and the slide unit 40 to be slid against each other as described above, a structure for guiding the sliding operation of the main unit 30 and display unit 40 against each other should be provided on, coupled to or integral with the units themselves.

In the embodiment of FIG. 3, a main plate 50 and a slide plate 60 can be fixed to the main unit 30 and the slide unit 40, respectively. However, the present invention is not intended to be so limited. For example, a structure to be described below may be directly provided on the main unit 30 and the slide unit 40 without using the main plate 50 and the slide unit 60.

As shown in FIG. 4, the main plate 50 can take the shape of a plate having a predetermined area. Rotating guides 52 can be rotatably installed onto the main plate 50. Each of the rotating guides 52 is rotated about a rotation shaft (not shown) on the main plate 50. A through-hole 53 is bored through the rotating guide 52 in a horizontal direction, (e.g., a diameter direction). An end of a guide bar 65 (described below) can be inserted into the through-hole 53.

Preferably, the rotating guide 52 is installed in the middle of a movement stroke of the slide unit 40. For example, if a movement stroke of the slide unit 40 is L, a distance from an end point of the movement stroke of the slide unit 40 to the rotating guide 52 is L/2. However, the present invention is not intended to be so limited. For example, should the design establish the closed position should be more secure than the open position, the position of the rotating guide 52 could be offset.

The slide plate 60 can slide over the main plate 50. Although not shown in FIG. 4, a guide structure for guiding the sliding operation of the slide plate 60 is preferably formed on the main plate 50.

A hinge shaft 62 can be formed on the slide plate 60. The other end of the guide bar 65 is preferably coupled to the hinge shaft 62 such that the guide bar 65 can be rotated about the hinge shaft 62. To this end, a connection ring 66 can be installed at the other end of the guide bar 65. The hinge shaft 62 can be installed through the center of the connection ring 66. The connection ring 66 should be formed to have a diameter greater than that of other portions of the guide bar 65.

The guide bar 65 can be installed in such a manner that the connection ring 66 thereof coupled to the hinge shaft 62 while the opposite end thereof is fitted into the through-hole 53 of the rotating guide 52. Further, a coil spring 67 can be installed around the guide bar 65.

In embodiment of FIG. 4, the coil spring 67 can be positioned around an outer circumferential surface of the guide bar 65. That is, the guide bar 65 is fitted into the coil spring 67. However, the present invention is not intended to be so limited.

In addition, an end of the coil spring 67 can be supported on the connection ring 66 while the other end thereof is supported on a neighboring portion of the through-hole 53 on the rotating guide 52. Therefore, a compression degree of the coil spring 67 varies according to how far the guide bar 65 protrudes from the rotating guide 52 via the through-hole 53.

Figure 7:
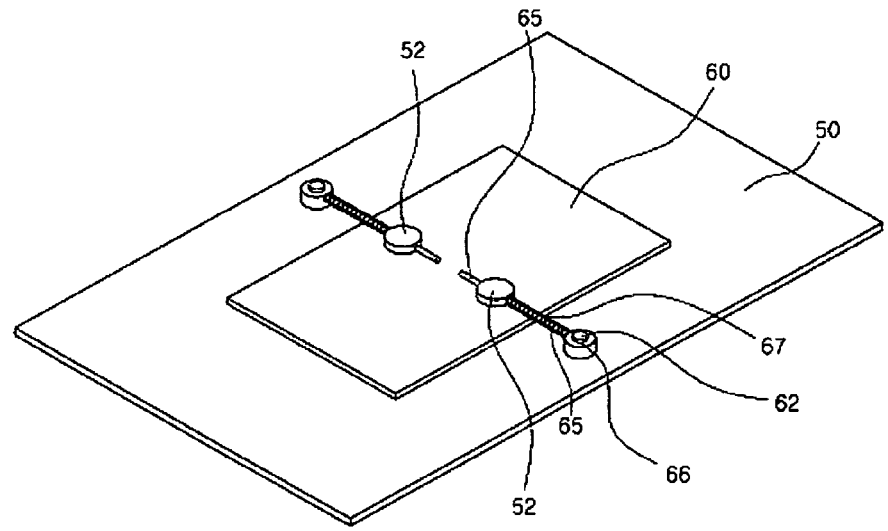
FIG. 7 is a diagram showing a perspective view of a structure of a slide driving mechanism according to another preferred embodiment of the present invention.

FIG. 7 shows another exemplary embodiment of a slide driving mechanism as shown in FIG. 7. The positions of the rotating guide 52 and the hinge shaft 62 are different from those of the previous embodiment. That is, the rotating guide 52 can be installed to the slide plate 60 while the hinge shaft 62 can be installed to the main plate 60.

Figure 8:
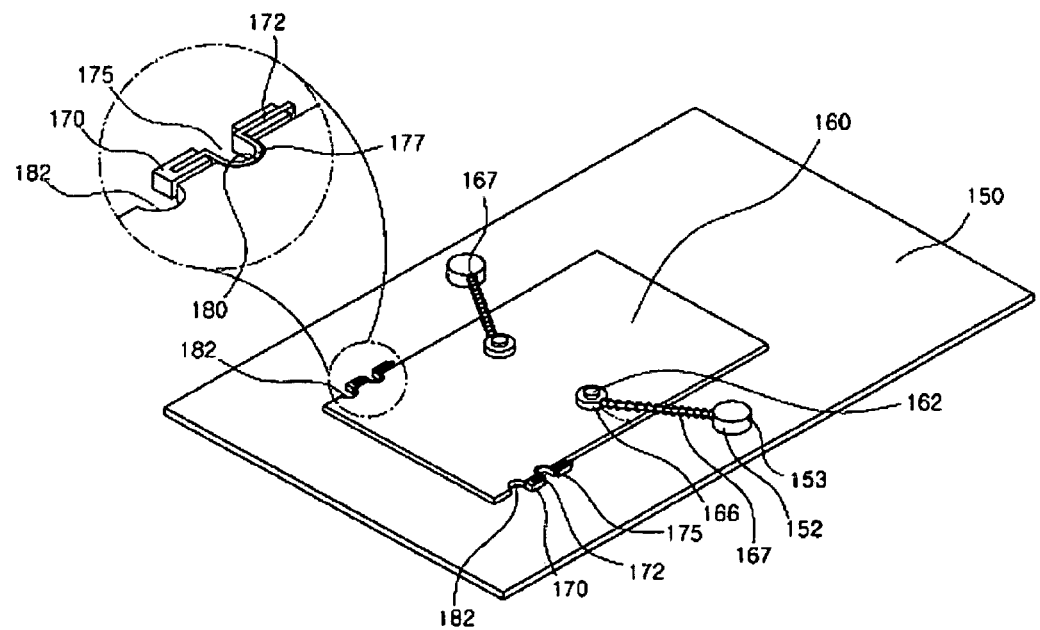
FIG. 8 is a diagram showing a perspective view of a structure of a slide driving mechanism according to a further preferred embodiment of the present invention.
Figure 9A:
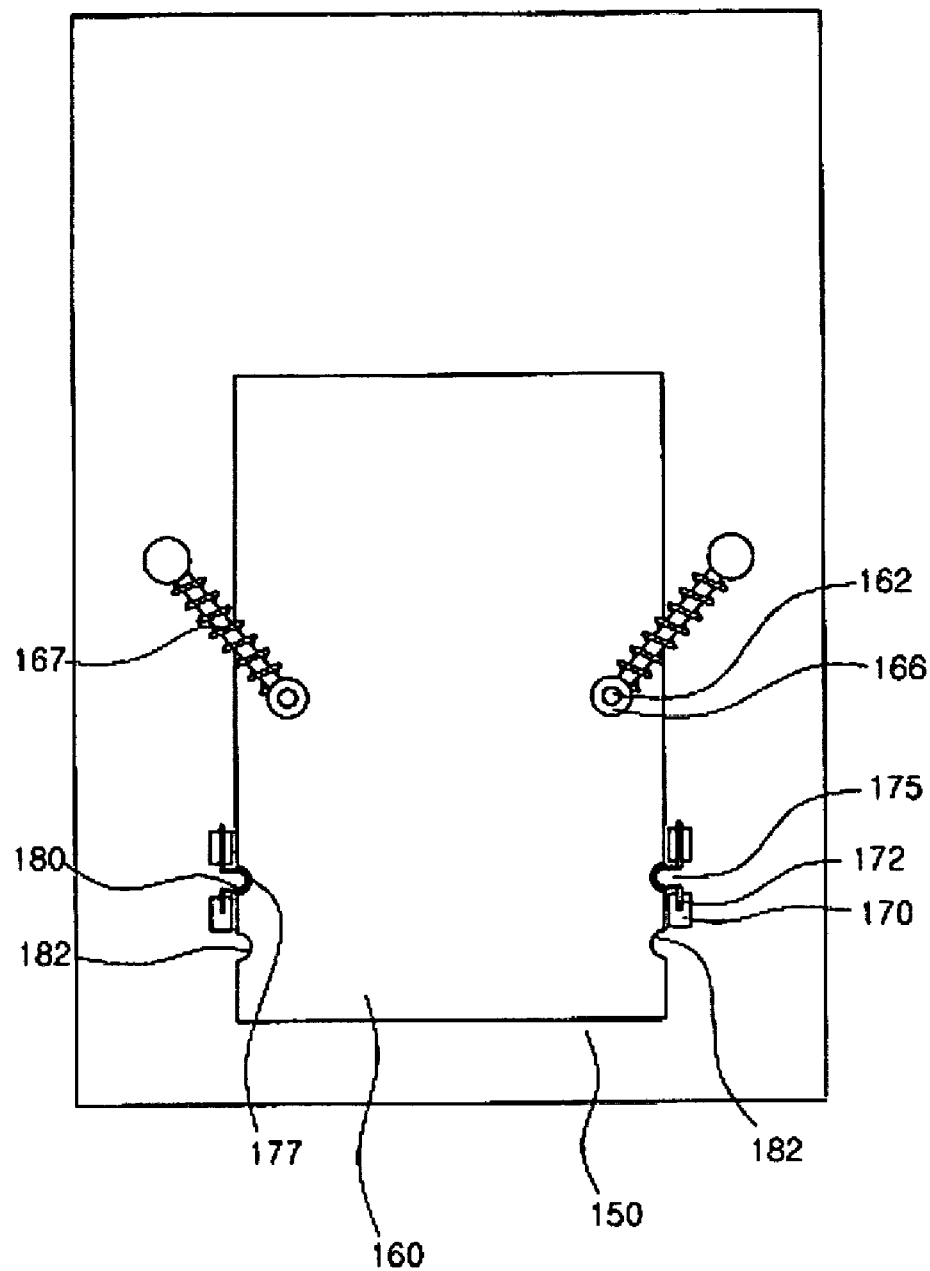
FIGS. 9a to 9c are diagrams showing operating sequences of the slide driving mechanism according to a further preferred embodiment of the present invention.

FIGS. 8 and 9 show another exemplary embodiment of a slide driving mechanism according to the present invention. As shown in FIGS. 8–9, a structure for causing the number keys 31 and the multimedia keys 33 to be exposed together that also allows only the multimedia keys 33 to be first exposed and then the number keys 31 to be exposed together with the multimedia keys 33 can be provided.

The structure of the embodiments of FIGS. 8–9 will now be described. In this embodiment, a main plate 150 and a slide plate 160 are provided on the main unit 30 and the slide unit 40, respectively. However, various structures described below may be directly provided on the main unit 30 and the slide unit 40 without using the main plate 150 and the slide unit 160.

The main plate 150 can take the shape of a plate having a predetermined area. Rotating guides 152 can be rotatably installed onto the main plate 150. Each of the rotating guides 152 can be rotated about a rotation shaft (not shown) on the main plate 150. A through-hole 153 is bored through the rotating guide 152 in a horizontal direction, e.g., a diameter direction. An end of a guide bar 165 can be inserted into the through-hole 153.

Preferably, the rotating guide 152 is installed in the middle of the movement stroke of the slide unit 40. For example, if the movement stroke of the slide unit 40 is L, a distance from an end point of the movement stroke of the slide unit 40 to the rotating guide 152 is L/2.

The slide plate 160 can slide over the main plate 150. A guide structure (not shown) for guiding the sliding operation of the slide plate 160 is preferably formed on the main plate 150.

A hinge shaft 162 can be formed on the slide plate 160. The other end of the guide bar 165 can be coupled to the hinge shaft 162 such that the guide bar 165 can be rotated about the hinge shaft 162. A connection ring 166 can be installed at the other end of the guide bar 165, and the hinge shaft 62 can also be installed through the center of the connection ring 166. The connection ring 166 should be formed to have a diameter greater than that of other portions of the guide bar 165. The guide bar 165 so constructed can be installed in such a manner that the connection ring 166 thereof is connected to the hinge shaft 162 while the opposite end thereof is fitted into the through-hole 153 of the rotating guide 152.

A coil spring 167 can be installed around the guide bar 165. A shown in FIG. 8, the coil spring 167 is positioned around an outer circumferential surface of the guide bar 165, that is, the guide bar 165 is fitted into the coil spring 167. In addition, an end of the coil spring 167 is supported on the connection ring 166 while the other end thereof is supported on a neighboring portion of the through-hole 153 on the rotating guide 152. Therefore, a compression degree of the coil spring 167 can vary according to how far the guide bar 165 protrudes from the rotating guide 152 via the through-hole 153.

Further, fixing ribs 170 can be formed on the main plate 150 at predetermined positions corresponding to lateral ends of the slide plate 160 along the movement stroke thereof. Each of the fixing ribs 170 can be formed with an insertion slot 172 in a longitudinal direction thereof. As shown in FIGS. 8–9, the fixing ribs 170 can be formed in pair at a predetermined interval. However, the present invention is not intended to be so limited.

A stopper spring 175 or the like can be installed between the pair of fixing ribs 170. The stopper spring 175 is preferably a kind of leaf spring and is also configured such that both ends thereof are fitted into the insertion slots 172 of the fixing ribs 170, respectively. A projection 177 can be formed at its central portion to protrude toward the lateral ends of the slide plate 160.

In addition, first and second stopper grooves 180 and 182 are formed at a predetermined interval on each of the lateral ends of the slide plate 160. However, the present invention is not intended to be so limited. The stopper grooves 180 and 182 are portions into which the projection 177 of the stopper spring 175 is selectively seated. In the embodiment of FIG. 8, the stopper grooves 180 and 182 are symmetrically formed in pair on the lateral ends of the slide plate 160. Alternatively, only the second stopper groove 182 may be formed. That is, the first stopper groove 180 may not be formed. In such a case, this structure may be used to allow the slide unit 40 to be stopped against the main unit 30 when the slide unit 40 has been moved at a lowermost position on the main unit 40. Alternatively, only the first stopper groove 172 or additional stopper grooves can be formed. Therefore, the slide pate 160 may be selectively stopped at a specific position(s) on the main plate 150 using the stopper spring 175 and the stopper grooves 180 and 182.

Operations of the slide type portable terminal according to embodiments of the present invention will now be described.

Sliding operations of embodiments of the slide type portable terminal according to the present invention will be described with reference to FIGS. 5a–6b. A state of FIG. 5a can correspond to that of FIG. 6a. At this time, the slide unit 40 can overlap the main unit 30, and the number keys 31 and the multimedia keys 33 are covered with the slide unit 40.

Figure 5A:
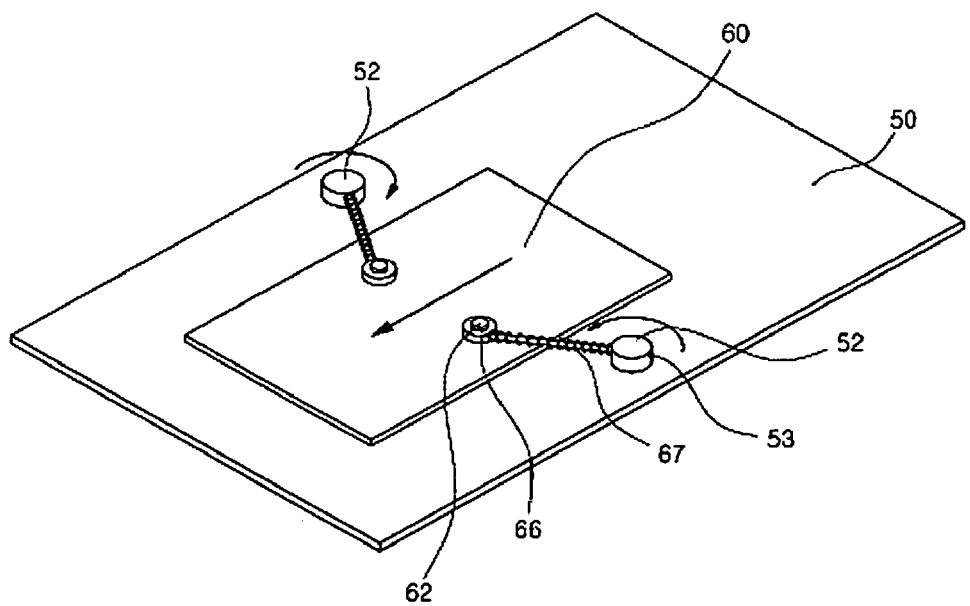
FIGS. 5a to 5c are diagrams showing operating sequences of the slide driving mechanism according to a preferred embodiment of the present invention.

The slide plate 60 can be positioned relatively lower than the main plate 50. As shown in FIG. 5a, therefore, the hinge shaft 62 can be relatively positioned lower than the rotating guide 52. At this time, the coil spring 67 is in a relatively lengthened state. In such a state, the coil spring 67 can exert an elastic force on the slide plate 60 in an arrow direction shown in FIG. 5a.

When a user pushes the slide unit 40 against the main unit 30 in such a state, the slide unit 40 can slide along the main unit 30. Accordingly, the slide plate 60 is moved in a direction opposite to the arrow direction shown in FIG. 5a.

Due to this movement of the slide plate 60, the hinge shaft 62 can gradually approach the rotating guide 52 and an end of the guide bar 65 can also protrude gradually from the through-hole 53 of the rotating guide 52. Thus, the coil spring 67 can be gradually compressed and elastically deformed.

Figure 5B:
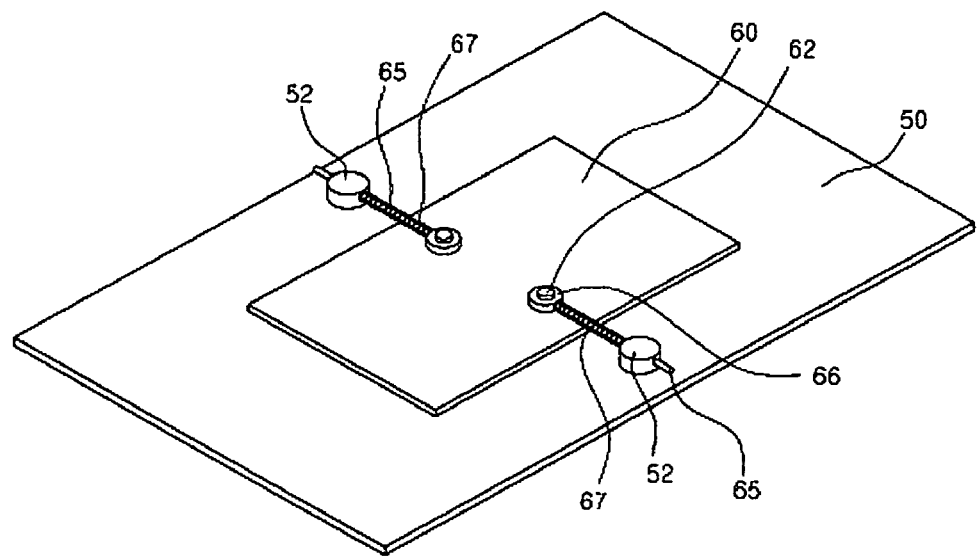
Figure 5C:
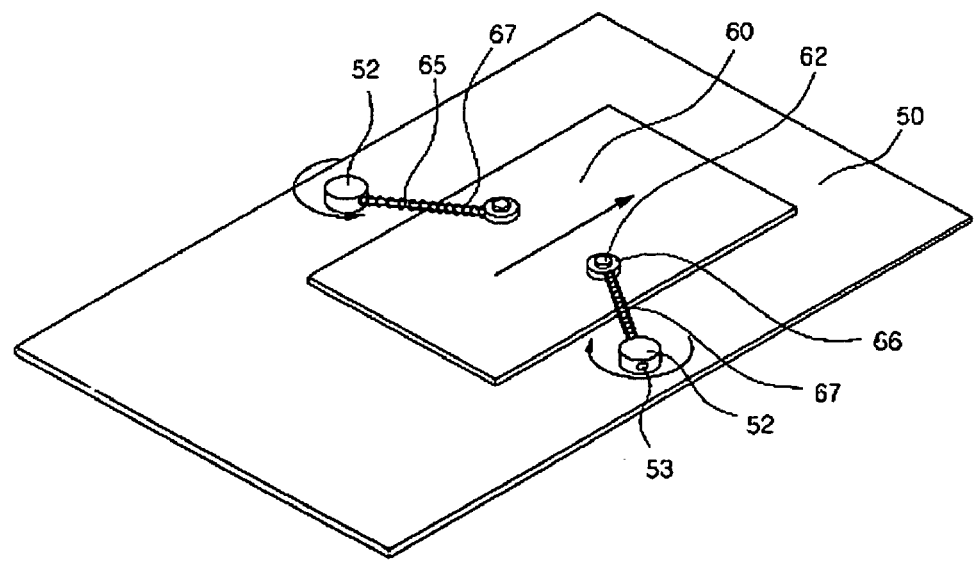

FIG. 5b shows a state where the slide unit 40 is in the middle of the movement stroke of the slide unit. In such a state, the coil spring 67 can be in a state where it is compressed to the utmost. Thus, the coil spring 67 exhibits an increased or maximum restoring force.

Figure 6A:
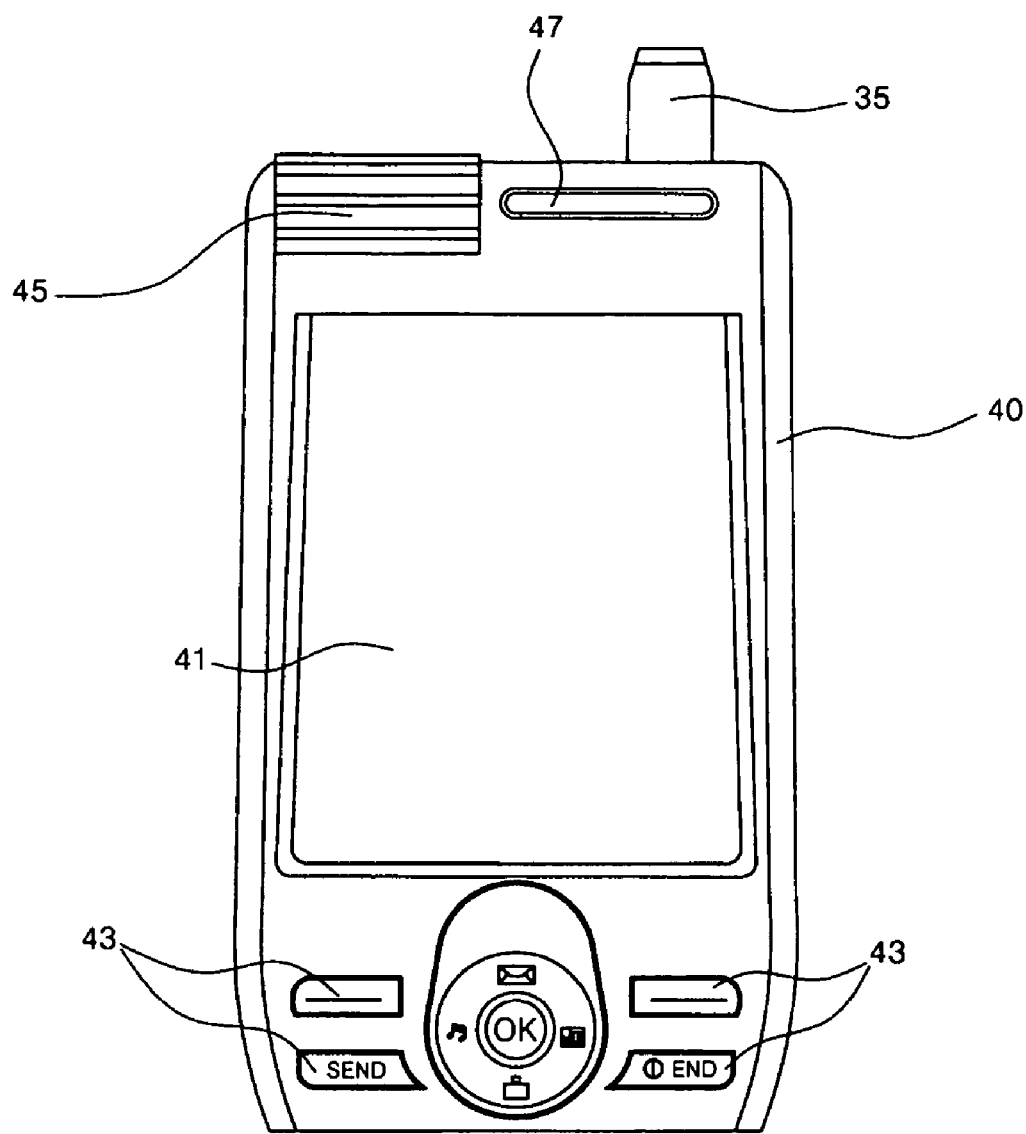
FIGS. 6a and 6b are diagrams showing operations of the portable terminal according to a preferred embodiment of the present invention.
Figure 6B:
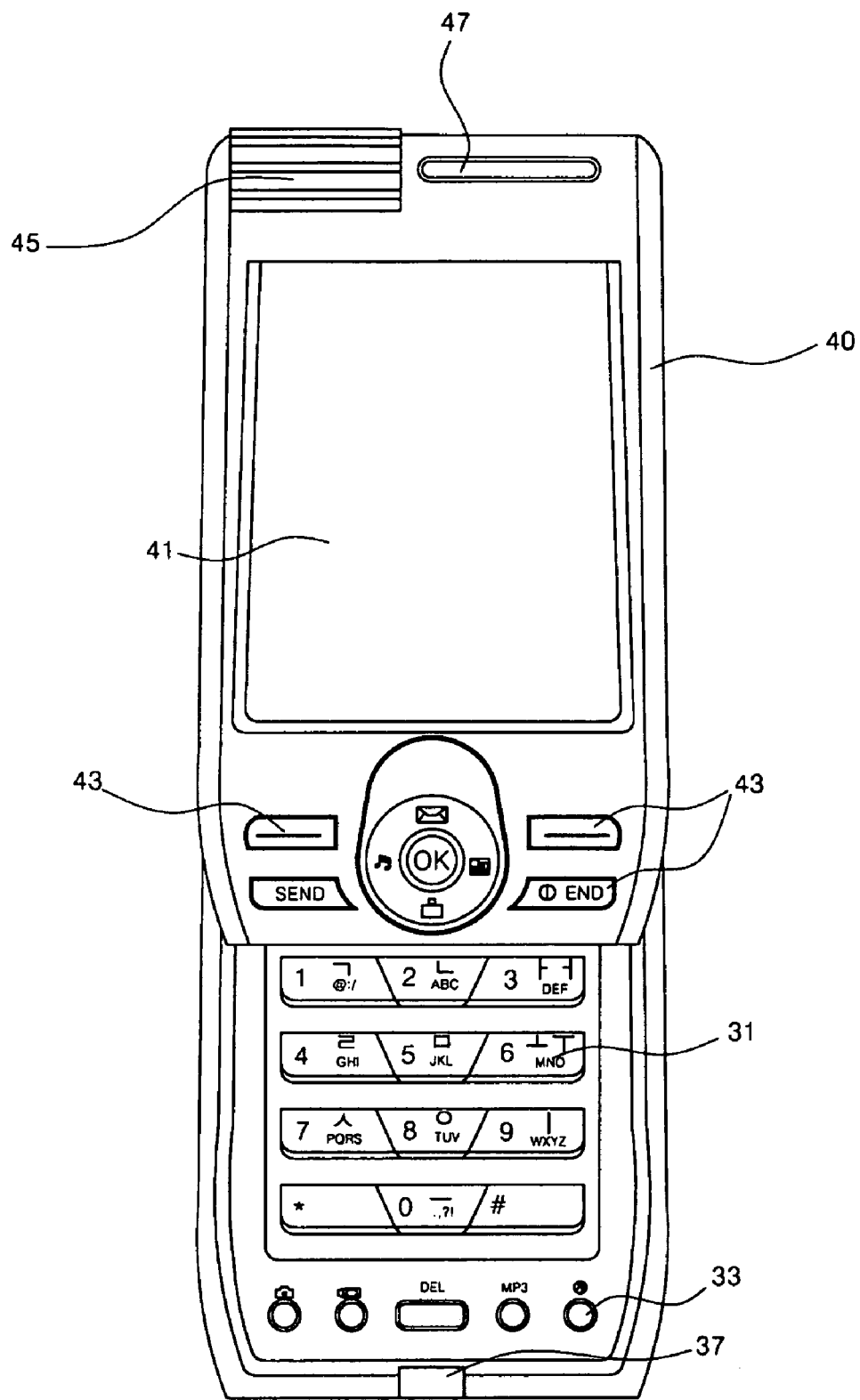

After the slide unit 40 has passed through the middle of the movement stroke, the slide unit 40 can start to move rapidly toward an end point of the movement stroke thereof because of the restoring force of the coil spring 67. Due to this restoring force, the slide unit 40 is preferably continuously moved until it comes into a state shown in FIG. 5c. A state of FIG. 5c can correspond preferably to that of FIG. 6b. As shown in FIG. 6b, the slide unit 40 is completely upward slid with respect to the main unit 30.

In such a fully open state, the user can use a variety of keys 31 and 33 provided on the main unit 30. The user can also use the telephone function through the microphone 37 and the speaker 47. Then, if the user exerts a predetermined force on the slide unit 40 in a direction opposite to an arrow direction shown in FIG. 5c, the portable terminal can move into a state shown in FIG. 5a, where the slide unit 40 overlaps the main unit 30.

Operations of the embodiment shown in FIG. 7 will now be described. In the embodiment illustrated in FIG. 7, operations are similar to the embodiment shown in FIGS. 5a–5c. However, the guide bars 65 can protrude inside the slide plate 60 in directions in which they are to be close to each other without protruding outside the slide plate 60. Thus, it is possible to make the lateral width of the terminal relatively small.

Operations of the embodiment illustrated in FIG. 8 will now be described with reference to FIGS. 9a–10b. In a state shown in FIG. 9a, the projection 177 of the stopper spring 175 can be seated in the first stopper groove 180. This preferably corresponds to a state where the slide unit 40 overlaps the main unit 30 as shown in FIG. 10a. In this state, the number keys 31 and the multimedia keys 33 can be covered with the slide unit 40.

Figure 9B:
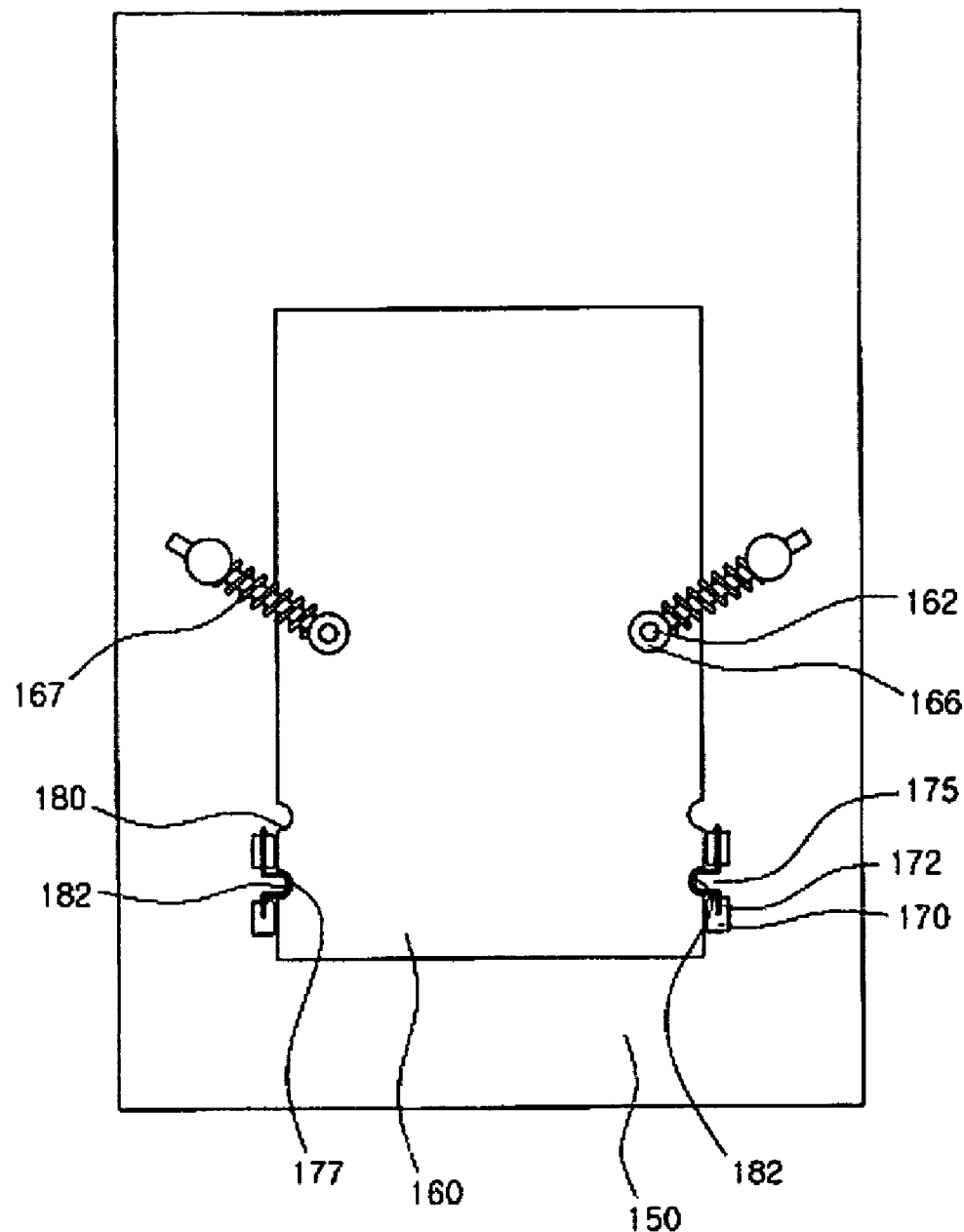
Figure 10A:
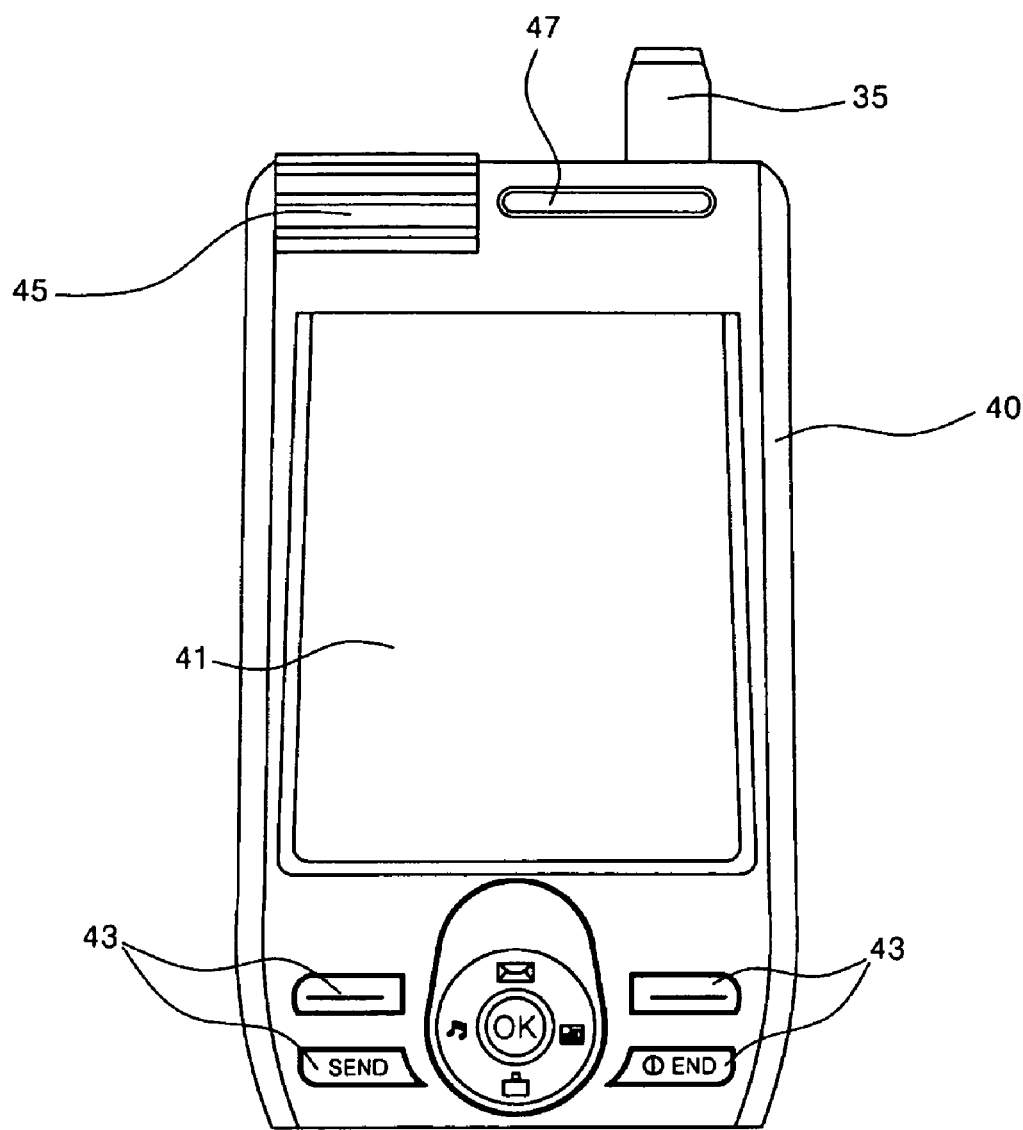
FIGS. 10a to 10c are diagrams showing sliding operations of a slide unit against a main unit in a further preferred embodiment shown in FIG. 8.

Then, when a user raises the slide unit 40 with respect to the main unit 30, the slide plate 160 can move upward, as shown in FIG. 9b, with respect to the main plate 150 while overcoming the elastic forces of the coil springs 167. Here, when a force is initially applied to the slide unit 40, it is required to apply such a force that the projection 177 can be allowed to escape from the first stopper groove 180 while the stopper spring 175 is elastically deformed. In order to further move the slide unit 40, a force overcoming the elastic forces of the coil springs 167 should be applied thereto.

Meanwhile, during the process of sliding the sliding plate 160 with respect to the main plate 150, the projection 177 of the stopper spring 175 can meet the second stopper groove 182. Then, the slide plate 160 preferably becomes stationary with respect to the main plate as shown in FIG. 9b. However, the projection 177 may pass by the second stopper groove 182 if such a force that the projection 177 can be caused to pass by the second stopper groove 182 is applied.

Figure 10B:
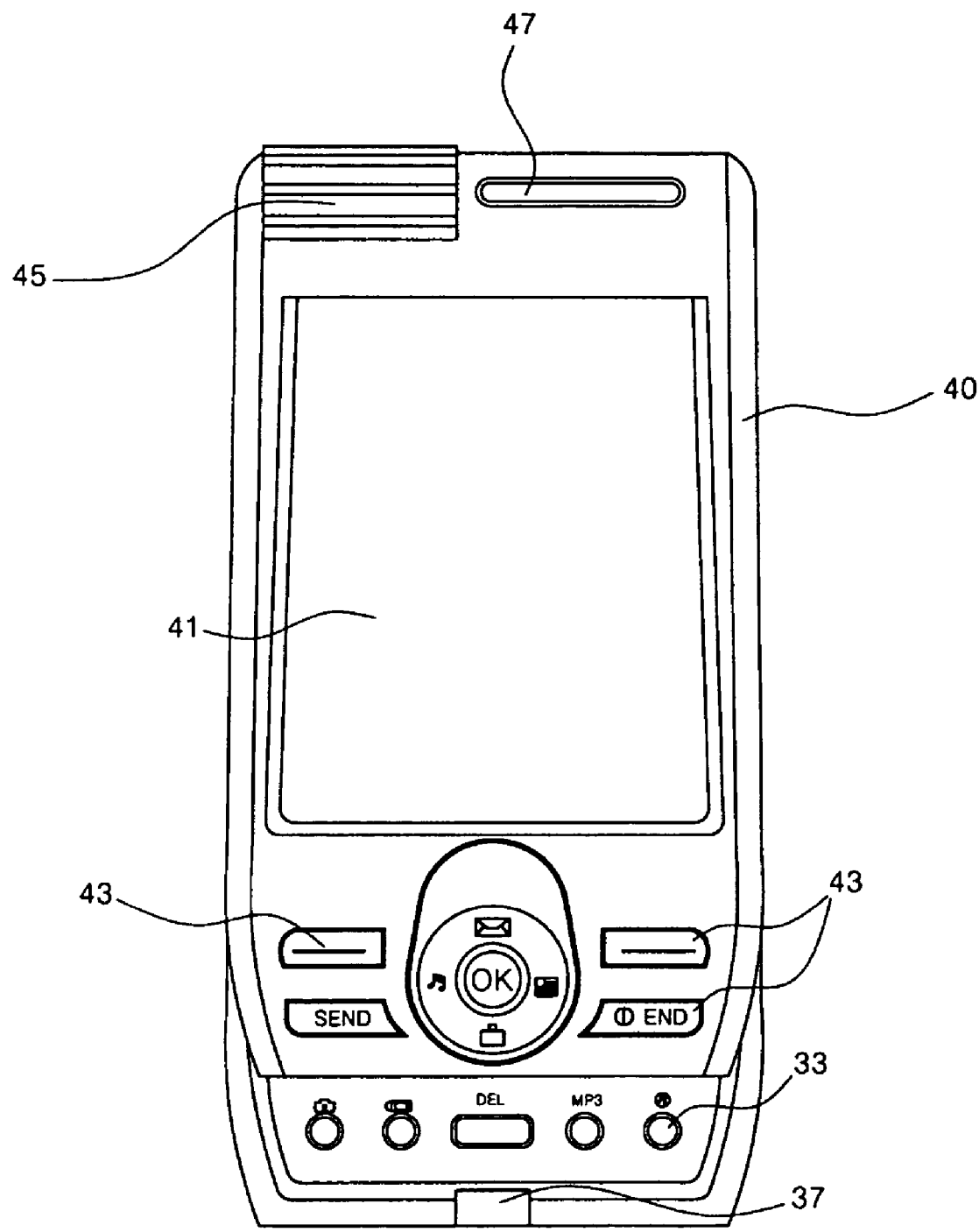

When the projection 177 is seated in the second stopper groove 182 in such a manner, the slide unit 40 is preferably raised relatively with respect to the main unit 30 as shown in FIG. 10b. Accordingly, only the multimedia keys 33 can be exposed to the outside.

Figure 9C:
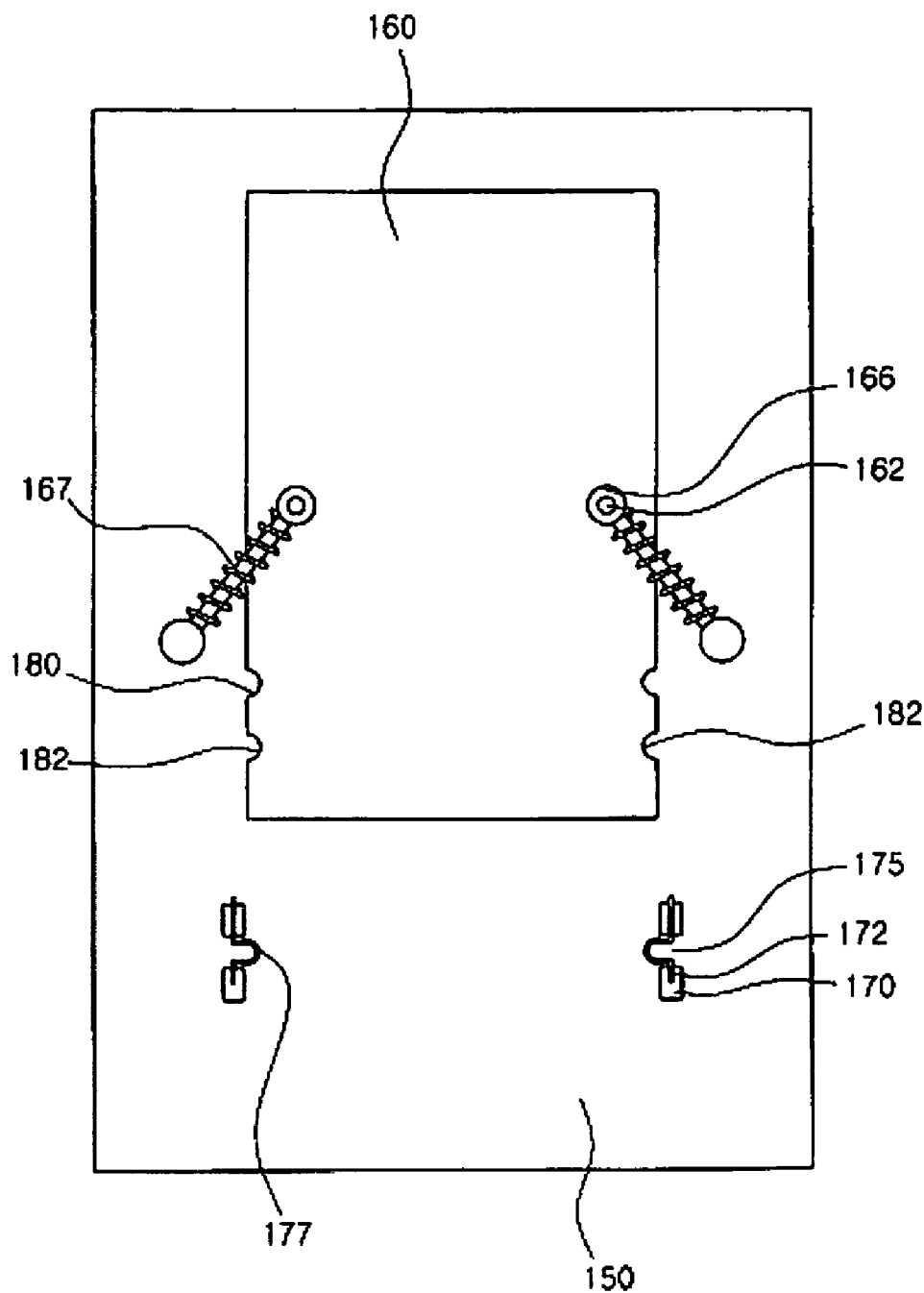
Figure 10C:
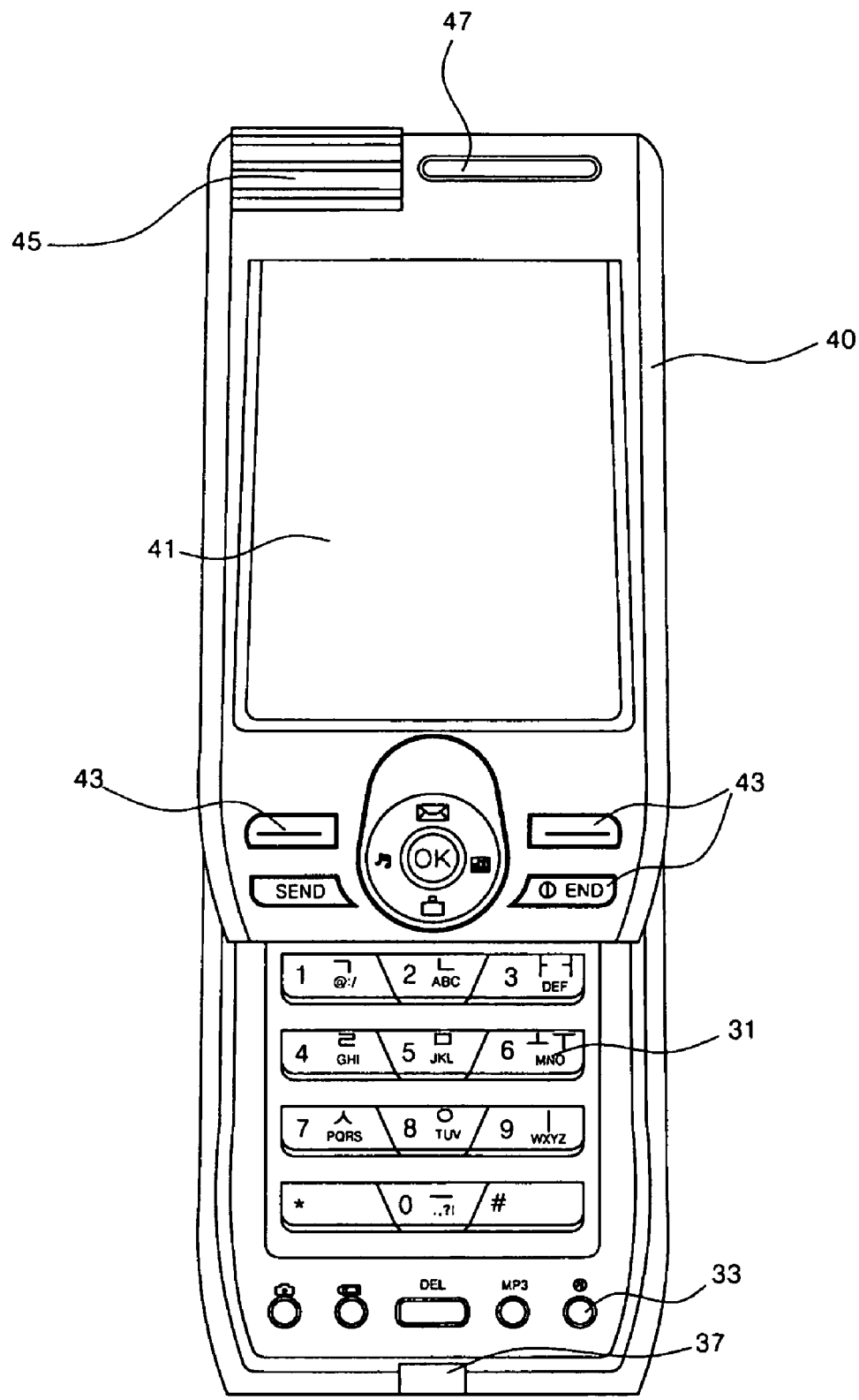

Then, when the user further applies a force to the slide unit 40 toward the top of the main unit 30, the slide plate 160 can be further moved with respect to the main plate 150 and to a state shown in FIG. 9c. The state can correspond a state where the slide unit 40 is maximally raised with respect to the main unit 30, as shown in FIG. 10c. That is, the number keys 31 and the multimedia keys 33 are simultaneously exposed to the outside.

In addition, at least one more stopper can be added. For example, the added stopper could be located to lock the fully closed position of embodiments of the slide type portable. Further, additional locations can include stoppers as desired.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with the other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of a slide type portable terminal and methods thereof have various advantages. Embodiments of a slide type portable terminal and methods thereof according to the present invention can cause coil springs to be elastically deformed while being guided by the guide bars when the slide unit is slid with respect to the main unit. Since the elastic deformation of the coil springs can be accurately made, the sliding operation of the slide unit can be consistently performed, to improve reliability of the operation of the slide unit. Further, since the elastic forces of the coil springs are rapidly exerted from an intermediate stage of the moving stroke of the slide unit, a user can more easily make the sliding operation of the slide unit with a smaller force.

In addition, embodiments can obtain an effect that the user can more securely feel the movement of the slide unit to the opened and closed positions, which can enhance the convenience of use. Also according to embodiments, a sliding unit can move with respect to the main unit through two stages. The user can perform a desired operation by causing the slide unit to expose only a portion of the main unit or an entire use portion of the entire main unit, if necessary. Therefore, the user can utilize the portable terminal in various arrangements, which can increase that user's convenience.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A slide type portable terminal, comprising:
   a main unit including a plurality of key sections on a surface of the main unit;
   a slide unit configured to slide along the surface of the main unit to cause the key sections of the main unit to be selectively covered; and
   a slide driving mechanism configured to cause the slide unit to slide using elastic forces of which elastic deformation is guided by guide bars, when the slide unit has been moved to a predetermined position with respect to the main unit, wherein each of the guide bars has each of both ends rotatably coupled to the main and slide units, respectively, and wherein the slide driving mechanism comprises,
      rotating guides rotatably secured on one of the main and slide units, that are formed with first supporters that support a first end of said respective guide bars, and
      wherein the rotating guides support the guide bars so that the lengths of portions of the guide bars protruding from the first supporters are changed as the slide unit is moved.

2. The terminal of claim 1, wherein the main unit comprises a main plate fixed thereto and the slide unit further comprises a slide plate fixed thereto, and wherein said each of both ends of each guide bar are respectively connected to the main and slide plates.

3. The terminal of claim 1, wherein a connection ring is formed at the second end of the both ends of each guide bar opposite to the first end thereof, and the connection ring is rotatably connected to a hinge shaft formed on the main or slide plate opposite to the rotating guide.

4. The terminal of claim 3, wherein coil springs are installed such that the guide bars penetrate therethrough, and each of the coil springs has one end supported by the connection ring and the other end supported around a through-hole of the rotating guide.

5. The terminal of claim 3, wherein the guide bars or rotating guides provided in the main plate are installed at positions corresponding to the center of a movement stroke of a slide plate.

6. The terminal of claim 5, comprising:
   a stopper mechanism configured to cause the slide unit to be selectively stopped with respect to the main unit at positions where the slide unit exposes selected ones of the plurality of the key sections;
   stopper springs with relatively protruding projections; and
   stopper grooves in which the projections of the stopper springs are selectively seated.

7. The terminal of claim 1, comprising a stopper mechanism configured to cause the slide unit to be selectively stopped with respect to the main unit at positions where the slide unit exposes selected ones of the plurality of the key sections.

8. The terminal of claim 7, wherein the stopper mechanism is provided at mutually corresponding positions in the main and slide plates, and comprises stopper springs with relatively protruding projections, and stopper grooves in which the projections of the stopper springs are selectively seated.

9. The terminal of claim 8, wherein the stopper grooves are formed to be symmetric with each other at lateral ends of the main or slide plate.

10. A slide type portable terminal, comprising:
    a main unit including a plurality of key sections on a surface of the main unit;
    a slide unit configured to slide along the surface of the main unit to cause the key sections of the main unit to be covered and exposed; and
    driving means for sliding the slide unit using elastic forces of which elastic deformation is guided by rotatable guide means, when the slide unit has been moved to a predetermined position with respect to the main unit.

11. The terminal of claim 10, wherein the guide means has both ends rotatably coupled to the main and slide units, respectively, and wherein the driving means comprises:
    rotating guide means that are formed with through-holes through which ends of respective guide means penetrate and are rotatably secured on one of the main and slide units, thereby supporting the guide means such that the lengths of portions of the guide means axially supporting the coil springs are changed as the slide unit is moved.

12. The terminal of claim 11, wherein the slide unit further comprises a main plate fixed thereto and the slide unit further comprises a slide plate fixed thereto, and both ends of each guide means are respectively connected to the main and slide plates.

13. The terminal of claim 12, wherein connection means is formed at the other end of the both ends of each guide means opposite to the end thereof penetrating through the through-hole of the rotating guide means, for rotatably connecting to a hinge shaft formed on the main or slide plate opposite to the rotating guide means.

14. The terminal of claim 13, wherein the coil springs are installed such that the guide means penetrate therethrough, and each of the coil springs has one end supported by the connection means and the other end supported around the through-hole of the rotating guide means.

15. The terminal of claim 14, comprising stopper means for causing the slide unit to be selectively stopped with respect to the main unit at positions where the slide unit exposes only selected key sections, wherein the stopper means is provided at mutually corresponding positions in the main and slide plates, and comprises:
engaging means for providing relatively protruding projections; and
engagement means for engaging the engaging means.

16. The terminal of claim 15, wherein the engaging means are formed to be symmetric with each other at lateral ends of the main or slide plate.

17. The terminal of claim 16, wherein the stopper means causes the main unit to be stopped a first position where only a first key section is exposes, and a second position where first and second key sections are exposed.

18. The terminal of claim 10, wherein the guide means or the rotating guides means provided in the main plate are installed at positions corresponding to the center of an entire movement stroke of a slide plate.

19. A slide type portable terminal, comprising:
a main unit including a plurality of key sections exposed in a surface of the main unit;
a slide unit configured to slide along the surface of the main unit to cause the key sections of the main unit to be selectively covered; and
a stopper mechanism configured to temporarily fix the slide unit at a plurality of positions where the key sections are selectively exposed, wherein the stopper mechanism comprises,
a plurality of stoppers with protruding projections on one of the main and the slide units, and
a plurality of stopper grooves recessed on the other of the main and the slide units and configured to removably receive the stoppers, wherein the stoppers move from a first stopper groove to a second stopper groove when force is applied to the slide unit, wherein each stopper comprises,
an extension hole,
a protruding member extending through the extension hole to a first side, and
an insertion slot configured to fix ends of the protruding member on a second side of the extension hole opposite the first side, and wherein the stoppers can be elastically deformed.

20. The slide type portable terminal of claim 19, wherein the slide unit can be selectively slid to an open position where both the first and second key sections of the main unit are exposed, a first position where only one of the key sections is exposed, and a closed position where both the first and second key sections are covered, wherein in the open, first and closed positions, the plurality of stoppers are within the stopper grooves.

21. The slide type portable terminal of claim 19, comprising a slide driving mechanism configured to cause the slide unit to slide using a resilient member of which elastic deformation is guided by rotatable guide bars, when the slide unit has been moved to a predetermined position with respect to the main unit, wherein lengths of the guide bars supporting the resilient member are changed as the slide unit is moved, and wherein the stoppers are stopper springs.

* * * * *